(12) United States Patent
Kim et al.

(10) Patent No.: US 7,964,279 B2
(45) Date of Patent: Jun. 21, 2011

(54) NANOCRYSTAL-POLYDIMETHYLSILOXANE COMPOSITE AND PREPARATION METHOD THEREOF

(75) Inventors: Sungjee Kim, Pohang-si (KR); JinSik Lee, Busan (KR); Songjoo Oh, Busan (KR)

(73) Assignees: Samsung Electronics Co., Ltd. (KR); Pohang University of Science and Technology Academy-Industry Foundation (KR)

( * ) Notice: Subject to any disclaimer, the term of this patent is extended or adjusted under 35 U.S.C. 154(b) by 193 days.

(21) Appl. No.: 12/289,477

(22) Filed: Oct. 29, 2008

(65) Prior Publication Data

US 2009/0281265 A1   Nov. 12, 2009

(30) Foreign Application Priority Data

May 8, 2008   (KR) .......................... 10-2008-0043075

(51) Int. Cl.
  *B32B 27/14*   (2006.01)

(52) U.S. Cl. ........ 428/403; 428/404; 428/405; 428/407; 528/285; 528/38; 528/44; 528/85

(58) Field of Classification Search .................. None
See application file for complete search history.

(56) References Cited

U.S. PATENT DOCUMENTS

2008/0127429 A1 *   6/2008   Brun et al. ...................... 8/435

* cited by examiner

*Primary Examiner* — Marc S Zimmer
(74) *Attorney, Agent, or Firm* — Cantor Colburn LLP

(57) ABSTRACT

Disclosed herein are a nanocrystal-polydimethylsiloxane composite and a method for preparing the same. More specifically, provided are a nanocrystal-polydimethylsiloxane composite in which one or more polydimethylsiloxane derivatives having urea cross-links are bound to the surface of a nanocrystal, and a method for preparing the same. The nanocrystal-polydimethylsiloxane composite comprises optically transparent polydimethylsiloxane with remarkably high durability, thus imparting improved luminescence efficiency and product reliability to various electronic devices, when applied as a luminescent material to the electronic devices.

20 Claims, 4 Drawing Sheets
(1 of 4 Drawing Sheet(s) Filed in Color)

ND-POLYDIMETHYLSILOXANE COMPOSITE AND PREPARATION METHOD THEREOF

NANOCRYSTAL-POLYDIMETHYLSILOXANE COMPOSITE AND PREPARATION METHOD THEREOF

This non-provisional application claims priority to Korean Patent Application No. 10-2008-43075, filed on May 8, 2008, and all the benefits accruing therefrom under U.S.C. §119 the contents of which is incorporated herein by reference in its entirety.

BACKGROUND OF THE INVENTION

1. Field of the Invention

This disclosure is directed to a nanocrystal-polydimethylsiloxane composite and a preparation method thereof. More specifically, this disclosure is directed to a nanocrystal-polydimethylsiloxane composite with superior luminescence efficiency as well as excellent optical stability and chemical stability, in which a nanocrystal and one or more polydimethylsiloxane derivatives having urea cross-links constitute a composite, and a method for preparing the composite.

2. Description of the Related Art

A nanocrystal is defined as a crystalline material having a size of a few nanometers, and consists of several hundred to several thousand atoms. Since such a small-sized nanocrystal has a large surface area per unit volume, most of the constituent atoms of the nanocrystal are present on the surface of the nanocrystal. Based on this characteristic structure, a nanocrystal exhibits quantum confinement effects and shows electrical, magnetic, optical, chemical and mechanical properties different from those inherent to the constituent atoms of the nanocrystal.

Controlling the size and composition of semiconductor nanocrystals enables control of the properties of the nanocrystals. Light-emitting devices, electronic devices and bioprobes, etc. employing these various characteristics of nanocrystals have been developed.

Nanocrystals are typically prepared by a chemical wetting method in which precursors are added to an organic solvent that can be coordinately bound to grow a variety of sizes of nanocrystals. This method has the advantage that desired sizes of nanocrystals can be prepared by varying the concentrations, synthesis temperature, and time of precursors used. However, due to their considerably small size, disadvantageously, final nanocrystals have increased surface area to volume ratio and increased surface defects, and are readily aggregated together. Furthermore, the surface defects act as energy traps present between energy bandgaps, thus disadvantageously causing a deterioration of luminescence efficiency of the nanocrystals.

In an attempt to solve these disadvantages, earnest efforts are being made to develop methods for preparing nanocrystal composites in which nanocrystals are stably dispersed in a matrix so that the nanocrystals maintain inherent luminescent properties and avoid oxidation or aggregation caused by external stimuli.

BRIEF SUMMARY OF THE INVENTION

Therefore, example embodiments provide a nanocrystal-polydimethylsiloxane composite with superior luminescence efficiency as well as excellent optical and chemical stability.

Example embodiments provide a method for preparing a nanocrystal-polydimethylsiloxane composite using a simple process that is applicable at ambient temperature.

Disclosed herein is a nanocrystal-polydimethylsiloxane composite in which one or more polydimethylsiloxane derivatives having a urea cross-link are bound to the surface of a nanocrystal.

The urea crosslink-containing polydimethylsiloxane derivative may be at least one of compounds represented by Formula I below:

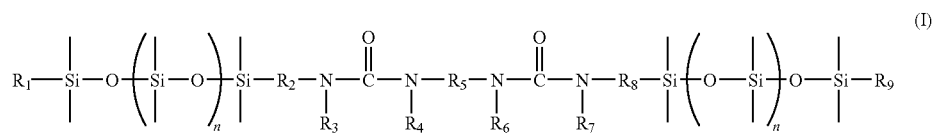

wherein $R_1$ and $R_9$ are each independently an amine-containing $C_{1-20}$ aliphatic or aromatic group; $R_2$, $R_5$ and $R_8$ are each independently a $C_{1-20}$ aliphatic or aromatic group; $R_3$, $R_4$, $R_6$ and $R_7$ are each independently hydrogen, or a $C_{1-20}$ aliphatic or aromatic group; and n and m are each independently an integer of 2 to 10.

The urea cross-link of the urea crosslink-containing polydimethylsiloxane derivative may be formed by cross-linking an amine functional group in an amine-containing polydimethylsiloxane derivative with isocyanate. The amine-containing polydimethylsiloxane derivative may be at least one of compounds represented by Formula II below:

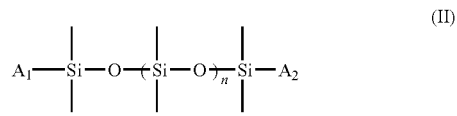

wherein n is an integer of 2 to 10, and $A_1$ and $A_2$ are each independently an amine-containing $C_{1-20}$ aliphatic or aromatic group.

Further disclosed herein is a method for preparing a nanocrystal-polydimethylsiloxane composite comprising: dispersing nanocrystals and polydimethylsiloxane derivatives having two or more amine functional groups in a solvent to prepare a solution of nanocrystal-polydimethylsiloxane composite wherein the nanocrystals are bound to the polydimethylsiloxane derivatives; and reacting the nanocrystal-polydimethylsiloxane composite solution with isocyanate, followed by drying, to obtain a nanocrystal-polydimethylsiloxane composite having urea cross-links formed between the polydimethylsiloxane derivatives.

BRIEF DESCRIPTION OF THE DRAWINGS

The patent or application file contains at least one drawing executed in color. Copies of this patent or patent application publication with color drawings will be provided by the office upon request and payment of the necessary fee.

Example embodiments will be more clearly understood from the following detailed description taken in conjunction with the accompanying drawings.

FIG. 1 is a schematic diagram illustrating the structure of a nanocrystal-polydimethylsiloxane composite according to one example embodiment;

FIG. 2 is a schematic diagram illustrating a core-shell type nanocrystal-polydimethylsiloxane composite according to one example embodiment, in which a polydimethylsiloxane derivative surrounds a nanocrystal;

FIG. 3 is a schematic diagram illustrating a process of forming a nanocrystal-polydimethylsiloxane composite according to one example embodiment;

FIG. 4 is an image of a nanocrystal-polydimethylsiloxane composite prepared in Example 1;

FIG. 5 is an image of a nanocrystal-polydimethylsiloxane composite prepared in Example 1, obtained by exposure to an ultraviolet lamp;

FIG. 6 is absorption spectra of a nanocrystal prepared in a Preparation Example and a nanocrystal-polydimethylsiloxane composite prepared in Example 1; and FIG. 7 is photoluminescence spectra of a nanocrystal prepared in the Preparation Example and a nanocrystal-polydimethylsiloxane composite prepared in Example 1.

DESCRIPTION OF THE PREFERRED EMBODIMENTS

Figure 1:
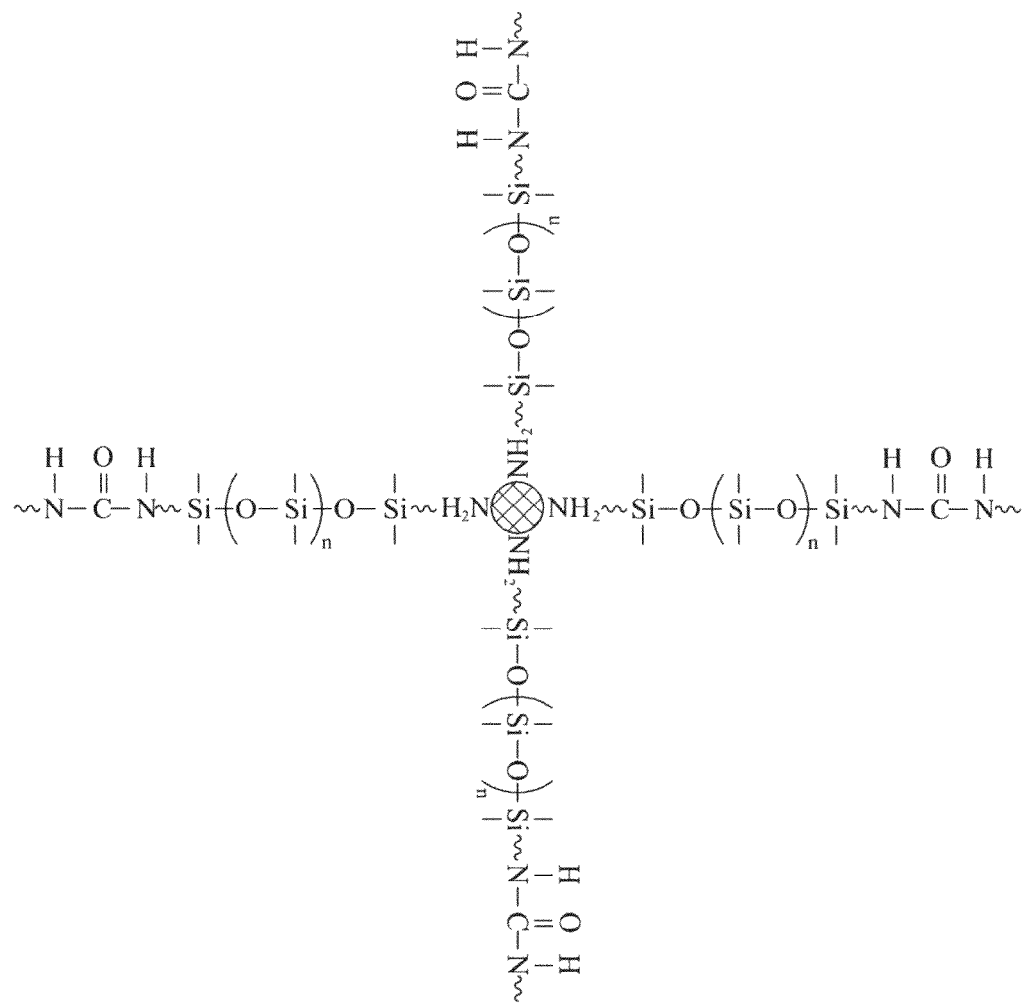
FIGS. 1-7 represent non-limiting, example embodiments as described herein.

Hereinafter, a detailed description will be given of example embodiments with reference to the accompanying drawings.

It will be understood that when an element or layer is referred to as being "on," "interposed," "disposed," or "between" another element or layer, it can be directly on, interposed, disposed, or between the other element or layer or intervening elements or layers may be present.

It will be understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, first element, component, region, layer or section discussed below could be termed second element, component, region, layer or section without departing from the teachings of the present invention.

As used herein, the singular forms "a," "an" and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the drawings, the thickness of layers and regions are exaggerated for clarity.

According to example embodiments, the nanocrystal-polydimethylsiloxane composite may have a structure in which polydimethylsiloxane derivatives having urea cross-links are bound to the surface of a nanocrystal. The urea cross-links may be formed by cross-linking amine functional groups in amine-containing polydimethylsiloxane derivatives with isocyanates.

The urea crosslink-containing polydimethylsiloxane derivative may be at least one of compounds represented by Formula I below:

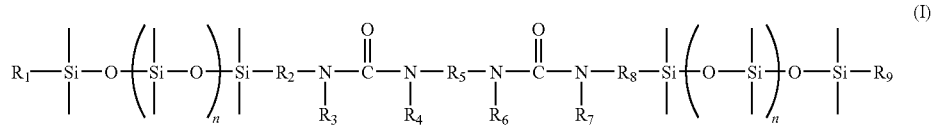

(I)

wherein $R_1$ and $R_9$ are each independently an amine-containing $C_{1-20}$ aliphatic or aromatic group; $R_2$, $R_5$ and $R_8$ are each independently a $C_{1-20}$ aliphatic or aromatic group; $R_3$, $R_4$, $R_6$ and $R_7$ are each independently hydrogen, or a $C_{1-20}$ aliphatic or aromatic group; and n and m are each independently an integer of 2 to 10.

The amine-containing polydimethylsiloxane derivative may be at least one of compounds represented by Formula II below:

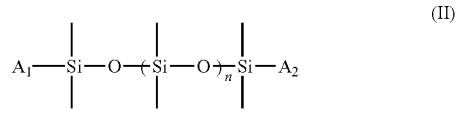

(II)

wherein n is an integer of 2 to 10, and $A_1$ and $A_2$ are each independently an amine-containing $C_{1-20}$ aliphatic or aromatic group.

FIG. 1 is a schematic diagram illustrating the structure of a nanocrystal-polydimethylsiloxane composite according to one example embodiment. As shown in FIG. 1, the nanocrystal-polydimethylsiloxane composite according to one example embodiment may have a structure in which one or more polydimethylsiloxane derivatives having a urea cross-link are bound to the surface of a nanocrystal. That is, the nanocrystal contained in the nanocrystal-polydimethylsiloxane composite is bound to polydimethylsiloxane derivatives which are optically transparent elastomers with remarkably high durability, thus having advantages of maintaining their inherent luminescent and electrical properties, as well as exhibiting superior stability and excellent formability.

When the semiconductor nanocrystals according to example embodiments are consecutively reacted with polydimethylsiloxane derivatives, a series of layers, in which the polydimethylsiloxane derivatives surround the nanocrystals, may be formed. In this case, the nanocrystals together with the polydimethylsiloxane derivatives may constitute core-shell structured nanocrystal-polydimethylsiloxane composites.

Figure 2:
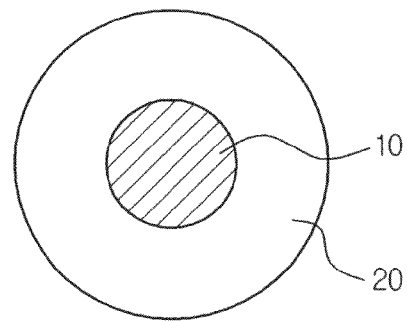

FIG. 2 is a schematic diagram illustrating a core-shell type nanocrystal-polydimethylsiloxane composite according to one example embodiment, in which a polydimethylsiloxane derivative surrounds a nanocrystal.

According to example embodiments, prior to bonding to the polydimethylsiloxane derivatives, the surfaces of nanocrystals may be selectively coordinated with organic materials. The coordination of nanocrystals with organic materials enables improvement of suspension stability and prevents aggregation between nanocrystals. These organic materials may be formed by solvents used in the process of growing nanocrystals. These organic materials are not particularly limited and examples thereof include $C_6$-$C_{22}$ alkanes and alkenes having a terminal carboxyl (COOH) group; $C_6$-$C_{22}$ alkanes and alkenes having a terminal phosphonic acid ($PO_3H_2$) group; $C_6$-$C_{22}$ alkanes and alkenes having a terminal phosphine oxide (PO) group; $C_6$-$C_{22}$ alkanes and alkenes having a terminal sulfhydryl (SOOH) group; and $C_6$-$C_{22}$ alkanes and alkenes having a terminal amino ($NH_2$) group. Specific examples of organic materials include, but are not limited to, oleic acid, stearic acid, palmitic acid, hexylphosphonic acid, n-octylphosphonic acid, tetradecylphosphonic acid, octadecylphosphonic acid, n-octyl amine and hexadecyl amine.

The nanocrystals that may constitute the nanocrystal-polydimethylsiloxane composite according to example embodiments, include most nanocrystals such as metal nanocrystals and semiconductor nanocrystals, prepared by a wet method. For example, of the nanocrystals, semiconductor nanocrystals may be selected from the group consisting of Group II-VI compounds, Group II-V compounds, Group III-VI compounds, Group III-V compounds, Group IV-VI compounds, Group I-III-VI compounds, Group II-IV-VI compounds, Group II-VI-V compounds, and alloys or combinations thereof.

Specifically, the nanocrystal may be at least one selected from the group consisting of CdS, CdSe, CdTe, ZnS, ZnSe, ZnTe, HgS, HgSe, HgTe, GaN, GaP, GaAs, InP, InAs, InSb, AlN, AlP, AlAs, AlSb, SiC, Fe, Pt, Ni, Co, Al, Ag, Au, Cu, FePt, Si, Ge, PbS, PbSe, PbTe, and alloys or combinations thereof.

When two or more of the aforementioned nanocrystals are present as the nanocrystal, they may be partially localized or may be present as a mixture or in an alloy form. The size of nanocrystals is not particularly limited and is preferably in the range of 10 nm to 100 nm.

Further, the nanocrystals may have a core-shell structure wherein shells are composed of large bandgap materials such as ZnS and ZnSe. The nanocrystal core is selected from the group consisting of CdS, CdSe, CdTe, ZnS, ZnSe, ZnTe, HgS, HgSe, HgTe, GaN, GaP, GaAs, InP, InAs, InSb, AlN, AlP, AlAs, AlSb, SiC, Fe, Pt, Ni, Co, Al, Ag, Au, Cu, FePt, Si, Ge, PbS, PbSe, PbTe, and alloys or combinations thereof. The nanocrystal shell is selected from the group consisting of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, and alloys or combinations thereof.

The nanocrystals in the nanocrystal-polydimethylsiloxane composite may take any shape depending upon reaction conditions. Specifically, the shape is selected from the group consisting of spheres, tetrahedrons, cylinders, rods, triangles, discs, tripods, tetrapods, cubes, boxes, stars, and tubes, but is not necessarily limited thereto. The nanocrystals are capable of efficiently emitting light in visible and other regions (e.g., ultraviolet and infrared regions).

Figure 3:
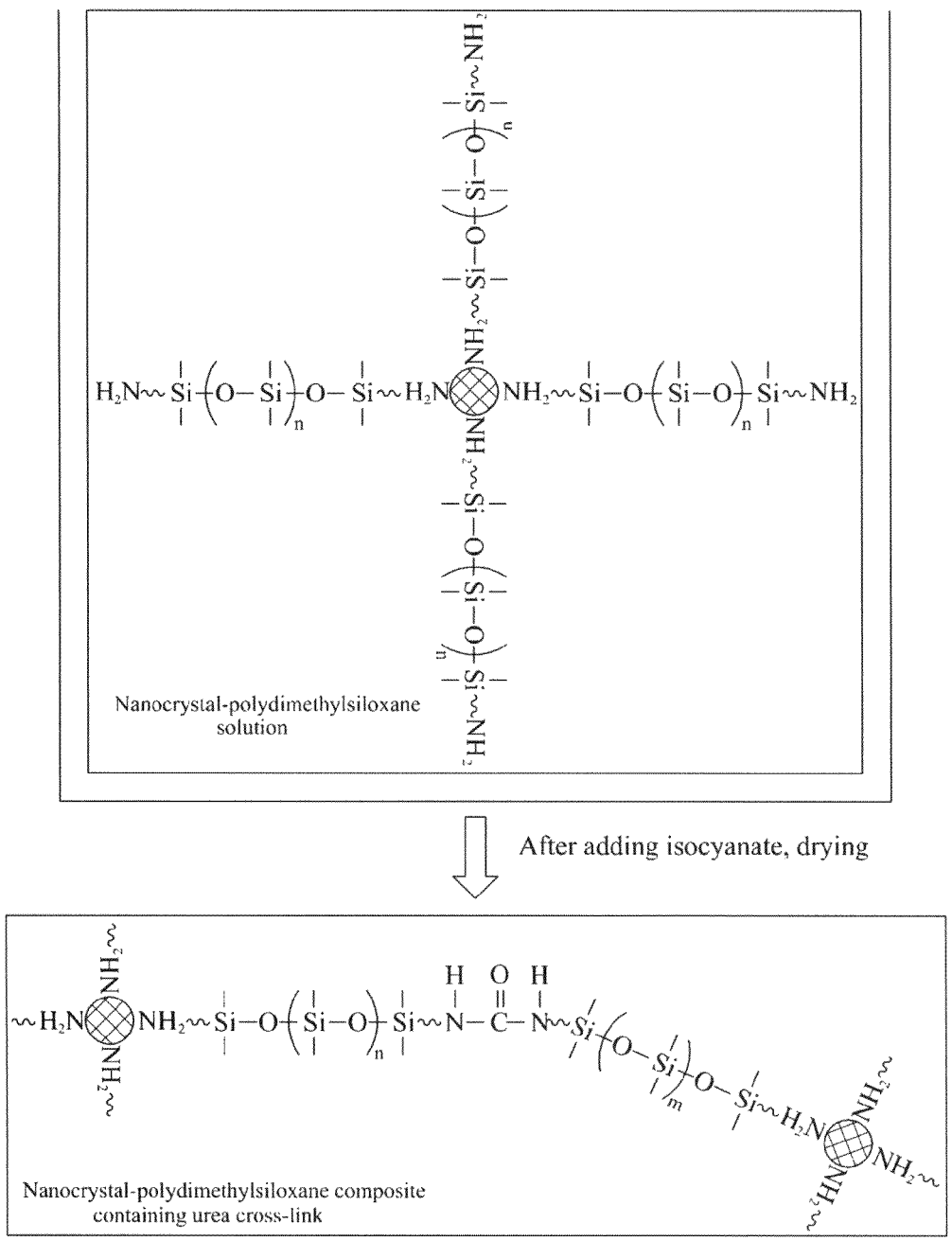

According to other example embodiments, provided is a method for preparing a nanocrystal-polydimethylsiloxane composite. FIG. 3 is a schematic diagram illustrating a method of preparing a nanocrystal-polydimethylsiloxane composite according to one example embodiment.

Hereinafter, the method for preparing the nanocrystal-polydimethylsiloxane composite will be illustrated in detail.

In the method of preparing nanocrystal-polydimethylsiloxane composites according to example embodiments, nanocrystals and polydimethylsiloxane composites having two or more amine functional groups are agitated in a solvent to prepare a solution of nanocrystal-polydimethylsiloxane derivative in which the nanocrystals are bound to the polydimethylsiloxane derivatives. In this process, one of amine functional groups present in the polydimethylsiloxane derivatives is used for bonding to the nanocrystal surfaces and the nanocrystals and polydimethylsiloxane derivatives are homogeneously dispersed in the solvent.

According to example embodiments, prior to bonding to polydimethylsiloxane derivatives, the surfaces of nanocrystals are selectively coordinated with organic materials. The coordination of nanocrystals with organic materials enables improvement of suspension stability and prevention of aggregation between nanocrystals. These organic materials may be formed by solvents used in the process of growing nanocrystals. These organic materials are not particularly limited and examples thereof include $C_6$-$C_{22}$ alkanes and alkenes having a terminal carboxyl (COOH) group; $C_6$-$C_{22}$ alkanes and alkenes having a terminal phosphonic acid ($PO_3H_2$) group; $C_6$-$C_{22}$ alkanes and alkenes having a terminal phosphine oxide (PO) group; $C_6$-$C_{22}$ alkanes and alkenes having a terminal sulfhydryl (SOOH) group; and $C_6$-$C_{22}$ alkanes and alkenes having a terminal amino ($NH_2$) group. Specific examples of organic materials include, but are not limited to, oleic acid, stearic acid, palmitic acid, hexylphosphonic acid, n-octylphosphonic acid, tetradecylphosphonic acid, octadecylphosphonic acid, n-octyl amine and hexadecyl amine.

The polydimethylsiloxane derivative having two or more amine functional groups comprises a polydimethylsiloxane chain and amine functional groups and is represented by Formula II below:

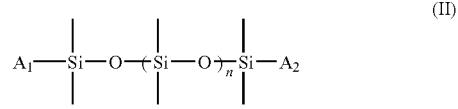

(II)

wherein n is an integer of 2 to 10, and $A_1$ and $A_2$ are each independently an amine-containing $C_{1-20}$ aliphatic or aromatic group.

In the step of preparing the nanocrystal-polydimethylsiloxane derivative solution, nanocrystals and the polydimethylsiloxane derivative having amine functional groups are dispersed in a solvent. Examples of solvents that can be used for the preparation include, but are not necessarily limited to, alkyl alcohols, acetone, ethyl acetate, dichloromethane, chloroform, dimethylformamide, tetrahydrofuran, dimethylsulfoxide, pyridine, alkyl amines and mixtures thereof.

Subsequently, isocyanate is added to the nanocrystal-polydimethylsiloxane derivative solution and then agitated. At this time, the free amine of the polydimethylsiloxane derivative that is not bound to the nanocrystals is reacted with the isocyanate group to form a cross-link between the polydimethylsiloxane derivatives. Due to considerably high reactivity between the amine and the isocyanate, this curing reaction is completed at ambient temperature within a short time and realizes mass-production.

Examples of isocyanates that can be used in the method include, but are not limited to, diisocyanatohexane, methylene diphenyl diisocyanate (MDI), polymeric methylene diphenyl diisocyanate, toluene diisocyanate (TDI), hexamethylene diisocyanate, trimethyl hexamethylene diisocyanate, phenylene diisocyanate, dimethyl diphenyl diisocyanate, tetramethylene diisocyanate, iso holon diisocyanate, naphthalene diisocyanate, triphenyl methane triisocyanate and any mixture thereof.

As such, the polydimethylsiloxane derivative comprises two or more amines, in which one of the amines is bound to the nanocrystal surface and the other amines are reacted with isocyanate to form urea cross-links between the polydimethylsiloxane derivatives.

Then, the urea crosslink-containing nanocrystal-polydimethylsiloxane derivative solution is dried. At this time, in order to improve dispersability and stability of the nanocrystals, a capping agent having $Si(OR)_3$ terminal groups may be added to the solution. The drying temperature is not particularly limited. A firmly solidified nanocrystal-polydimethylsiloxane composite can be obtained even when drying is carried out at ambient temperature without any additional thermal treatment.

The polydimethylsiloxane derivative of the nanocrystal-polydimethylsiloxane composite thus prepared may be represented by Formula I below:

InP, InAs, InSb, AlN, AlP, AlAs, AlSb, SiC, Fe, Pt, Ni, Co, Al, Ag, Au, Cu, FePt, Pd, Si, Ge, PbS, PbSe, PbTe, and alloys or combinations thereof.

In addition, the nanocrystals may be core-shell structured nanocrystals. The nanocrystal core is selected from the group consisting of CdS, CdSe, CdTe, ZnS, ZnSe, ZnTe, HgS, HgSe, HgTe, GaN, GaP, GaAs, InP, InAs, InSb, AlN, AlP, AlAs, AlSb, SiC, Fe, Pt, Ni, Co, Al, Ag, Au, Cu, FePt, Pd, Si, Ge, PbS, PbSe, and PbTe, and alloys or combinations thereof. The nanocrystal shell is selected from the group consisting of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, Fe, Pt, Ni, Co, Al, Ag, Au, Cu, FePt, Pd, Si, Ge, and alloys or combinations thereof.

The nanocrystals that can be used in the method may be prepared by any method well-known in the art. For example, a Group V or VI precursor is added to a mixing system of a dispersant containing Group II, III or IV precursor and a solvent, and is allowed to react with each other to grow nanocrystals, thereby preparing nanocrystals.

Examples of metal precursors that can be used for the preparation of nanocrystal cores or shells include, but are not necessarily limited to, dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, dimethyl cadmium, diethyl cadmium, cadmium acetate, cadmium acetylacetonate, cadmium iodide, cadmium bromide, cadmium chloride, cadmium fluoride, cadmium car-

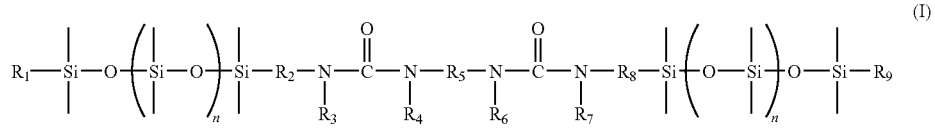

(I)

wherein $R_1$ and $R_9$ are each independently an amine-containing $C_{1-20}$ aliphatic or aromatic group; $R_2$, $R_5$ and $R_8$ are each independently a $C_{1-20}$ aliphatic or aromatic group; $R_3$, $R_4$, $R_6$ and $R_7$ are each independently hydrogen, or a $C_{1-20}$ aliphatic or aromatic group; and n and m are each independently an integer of 2 to 10.

In the method for preparing the nanocrystal-polydimethylsiloxane composite, the concentration and type of polydimethylsiloxane derivative and reaction time are controlled, a great amount of polydimethylsiloxane derivatives are bound to the nanocrystal surfaces to form consecutive or nonconsecutive polydimethylsiloxane derivative layers. In this case, core-shell structures can be formed, which consist of the nanocrystals and polydimethylsiloxane derivative organic layers.

The method is applicable to nanocrystals in various shapes including spheres, tetrahedrons, cylinders, rods, triangles, discs, tripods, tetrapods, cubes, boxes, stars and tubes.

The nanocrystals that can be used in the method are not particularly limited. For example, the nanocrystals may be selected from the group consisting of metals, Group II-VI compounds, Group II-V compounds, Group III-VI compounds, Group III-V compounds, Group IV-VI compounds, Group I-III-VI compounds, Group II-IV-VI compounds, Group II-VI-V compounds, and alloys or combinations thereof. Non-limiting examples thereof include CdS, CdSe, CdTe, ZnS, ZnSe, ZnTe, HgS, HgSe, HgTe, GaN, GaP, GaAs, bonate, cadmium nitrate, cadmium oxide, cadmium perchlorate, cadmium phosphide, cadmium sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bisacetylacetonate, tin bromide, tin chloride, tin fluoride, tin oxide, tin sulfate, germanium tetrachloride, germanium oxide, germanium ethoxide, gallium acetylacetonate, gallium chloride, gallium fluoride, gallium oxide, gallium nitrate, gallium sulfate, indium chloride, indium oxide, indium nitrate, and indium sulfate.

In addition, examples of the Group VI or V element compounds that can be used for formation of nanocrystal cores include alkyl thiol compounds, such as hexane thiol, octane thiol, decane thiol, dodecane thiol, hexadecane thiol and mercaptopropyl silane, sulfur-trioctylphosphine (S-TOP), sulfur-tributylphosphine (S-TBP), sulfur-triphenylphosphine (S-TPP), sulfur-trioctylamine (S-TOA), trimethylsilyl sulfur, ammonium sulfide, sodium sulfide, selenium-trioctylphosphine (Se-TOP), selenium-tributylphosphine (Se-TBP), selenium-triphenylphosphine (Se-TPP), tellurium-trioctylphosphine (Te-TOP), tellurium-tributylphosphine (Te-TBP), tellurium-triphenylphosphine (Te-TPP), trimethylsilyl phosphine, alkyl phosphine (for example, triethylphosphine, tributylphosphine, trioctylphosphine, triphenylphosphine and tricyclohexylphosphine), arsenic oxide, arsenic chloride, arsenic sulfate, arsenic bromide, arsenic iodide, nitric oxide, nitric acid, ammonium nitrate and the like.

Specific examples of solvents that can be used for preparation of nanocrystals include $C_{6-22}$ primary alkyl amines, $C_{6-22}$ secondary alkyl amines and $C_{6-22}$ tertiary alkyl amines; $C_{6-22}$ primary alcohols, $C_{6-22}$ secondary alcohols and $C_{6-22}$ tertiary alcohols; $C_{6-22}$ ketones and $C_{6-22}$ esters; $C_{6-22}$ heterocyclic compounds containing nitrogen or sulfur; $C_{6-22}$ alkanes, $C_{6-22}$ alkenes and $C_{6-22}$ alkynes; trioctylamine, trioctylphosphine and trioctylphosphine oxide.

The method according to the example embodiments eliminates the necessity of surface-modifying the synthesized nanocrystals, thus enabling process simplification and maintaining inherent luminescent and electrical properties of the nanocrystals.

According to other example embodiments, provided is an electronic device comprising the nanocrystal-polydimethylsiloxane composite. The nanocrystal-polydimethylsiloxane composite can be utilized in energy fields including: displays requiring a luminescent material (e.g., plasma display panels (PDPs) and light-emitting diodes (LEDs)), electroluminescent devices using nanocrystals for a light-emitting layer, lasers, linear photodiodes, sensors such as biosensors which react with a target material to emit light, and photovoltaic devices.

In particular, since a pure spectrum in a visible region can be obtained from the nanocrystal-polydimethylsiloxane composite, the composite is useful in production of a light-emitting layer of light-emitting devices. The introduction of the nanocrystal into the light-emitting layer can be carried out by a common technique such as vapor deposition, sputtering, printing, coating, ink-jetting and electron beam methods. The thickness of the light-emitting layer of the nanocrystal-polydimethylsiloxane composite may be freely controlled without particular limitation.

The electroluminescent device according to example embodiments may broadly include all devices that convert electric energy into light energy. Since the nanocrystal-polydimethylsiloxane composite of example embodiments has advantages of band gap controllability, high quantum efficiency and superior color purity, it can be used as a luminescent material for various electroluminescent devices.

Examples of electroluminescent devices include organic/inorganic hybrid electroluminescent devices that emit light in nanocrystals where holes injected through a hole transport layer from a hole injecting electrode are recombined with electrons injected through an electron transport layer from an electron injecting electrode. Such an organic/inorganic hybrid electroluminescent device includes a substrate, a hole injecting electrode, a hole transport layer, a light-emitting layer, an electron transport layer and an electron injecting electrode laminated in this order. The light-emitting layer may have a nanocrystal-polydimethylsiloxane composite. If desired, a hole blocking layer may be interposed between the light-emitting layer and the electron transport layer.

The present invention will now be described in further detail with reference to the following examples. These examples are for illustrative purposes only and are not intended to limit the scope of the present invention.

EXAMPLES

Preparation Examples

Oleylamine-Capped CdSe/CdS.ZnS Nanocrystals 0.75 g of cadmium acetate and 1.8 mL of oleic acid were charged in a flask and then dissolved by heating under vacuum at 100° C. When the cadmium acetate together with the oleic acid formed a complex compound and the solution turned yellow, the reaction mixture was allowed to cool to ambient temperature and a solution (1.0 M, 6.0 ml) of selenium in trioctylphosphine was mixed with the complex compound formed by the cadmium acetate and oleic acid, to prepare an injection solution. Meanwhile, 15 ml of octadecene and 4 ml of oleylamine were charged in a flask and heated to 315° C. under nitrogen atmosphere. Then, the injection solution was added to this reaction mixture and stirred at 280° C. for 10 minutes. The reaction solution was cooled to ambient temperature and then diluted with hexane. An excess of methanol was added thereto and the resulting nanocrystals were precipitated and separated using a centrifuge. The separated nanocrystals were charged together with 15 mL of octadecene in a flask and a nitrogen atmosphere at 120° C. was applied.

44.8 μL of diethylzinc and 82.1 μL of bis(trimethylsilyl)sulfide were added to 10 ml of trioctylphosphine under nitrogen atmosphere at ambient temperature and then stirred. The resulting solution was added dropwise to the flask containing the nanocrystals using a dropping funnel. After addition of the solution, the reaction mixture was further stirred for 30 minutes, an excess of methanol was added thereto and nanocrystals were precipitated and separated using a centrifuge.

Example 1

Preparation of nanocrystal-polydimethylsiloxane Composite 1.14 nmol of oleylamine-capped CdSe/CdS.ZnS nanocrystals prepared in Preparation Example and polydimethylsiloxane(bis(3-aminopropyl) terminated polydimethylsiloxane (Aldrich, 1 ml, 0.357 mmol) were dispersed in tetrahydrofuran (THF) and stirred at ambient temperature for 5 minutes to prepare a nanocrystal-polydimethylsiloxane derivative solution. Diisocyanatohexane (30 μL, 0.186 mmol) was added to the nanocrystal-polydimethylsiloxane derivative solution thus obtained, and stirred at ambient temperature for 10 minutes to form urea cross-links between polydimethylsiloxane derivatives. The solvent was removed and dried at ambient temperature for 24 hours to obtain CdSe/CdS.ZnS nanocrystal-polydimethylsiloxane composites.

Experimental Example 1

Figures 4, 5:
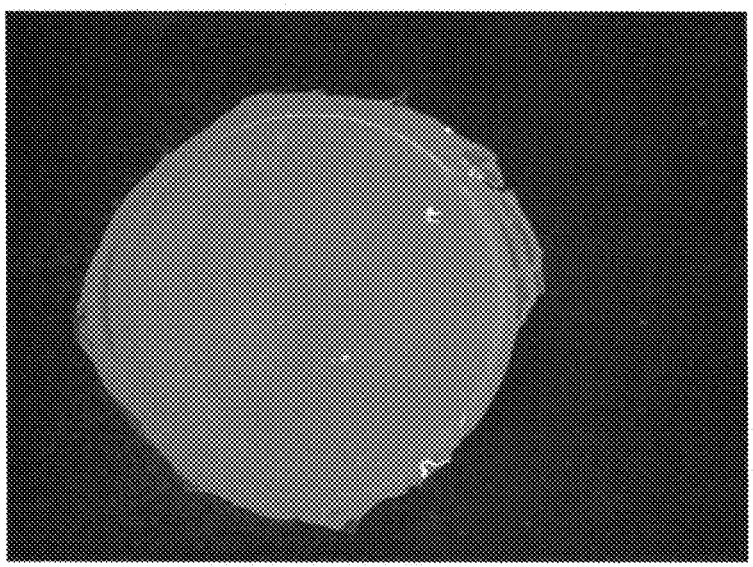

In order to evaluate the surface properties of nanocrystal-polydimethylsiloxane composites prepared in Example 1, an image of the nanocrystal-polydimethylsiloxane composite was obtained. The image is shown in FIG. 4. As can be seen from FIG. 4, the nanocrystal-polydimethylsiloxane composites prepared in Example 1 are still transparent. In addition, the image of nanocrystal-polydimethylsiloxane composites prepared in Example was taken by exposure to an ultraviolet lamp. The image is shown in FIG. 5. As can be seen from FIG. 5, the nanocrystal-polydimethylsiloxane composite prepared in Example 1 shows superior absorption and fluorescence properties.

Experimental Example 2

Figure 6:
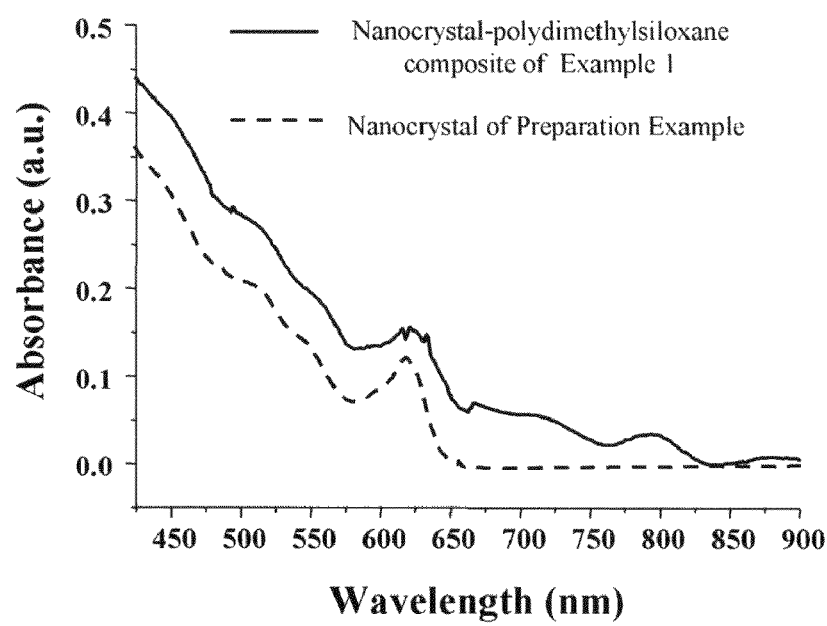

In order to evaluate the absorption efficiency of the nanocrystal-polydimethylsiloxane composite prepared in Example 1, absorption spectra were measured for the nanocrystal-polydimethylsiloxane composite prepared in Example 1 and nanocrystals not bonded to the polydimethylsiloxane derivative prepared in Preparation Example 1. The absorption spectra thus obtained are shown in FIG. 6. As can be seen from FIG. 6, initial maximum wavelengths of the nanocrystals prior to formation of the composite and the nanocrystal-polydimethylsiloxane composite prepared in Example 1 were 619 nm. This result indicates that before and after formation of the composites, absorption properties are maintained without any variation.

Experimental Example 3

Figure 7:
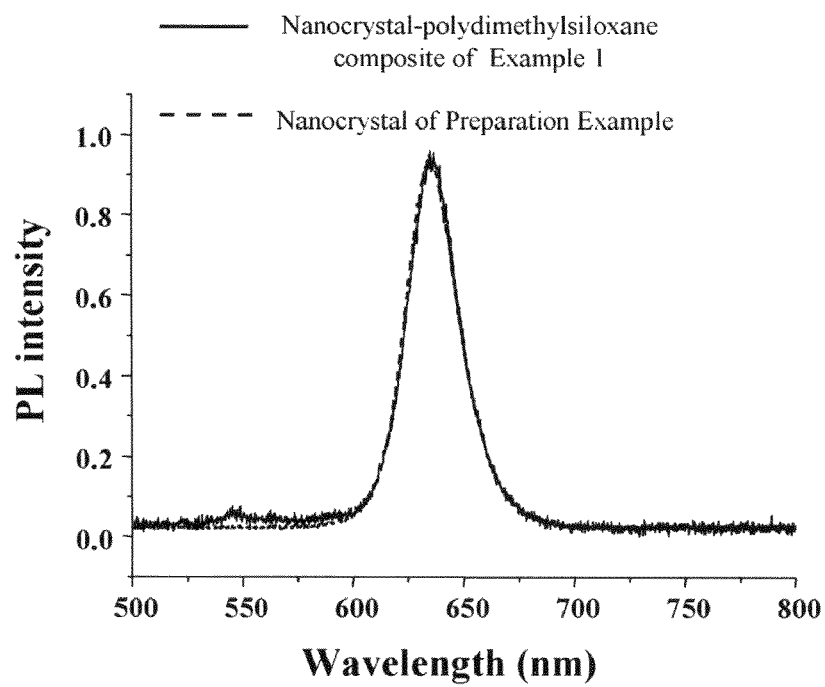

In order to evaluate luminescence efficiency of the nanocrystal-polydimethylsiloxane composites prepared in Example 1, photoluminescence spectra were measured for the nanocrystal-polydimethylsiloxane composite prepared in Example 1 and nanocrystals not bound with the polydimethylsiloxane derivative prepared in Preparation Example 1. The photoluminescence spectra thus obtained are shown in FIG. 7. As can be seen from FIG. 7, initial maximum wavelengths of the nanocrystals prior to formation of the composite and the nanocrystal-polydimethylsiloxane composite prepared in Example 1 were 635 nm. This result indicates that before and after formation of the composite, absorption properties are maintained without any variation.

Example embodiments have been described in detail with reference to the foregoing preferred embodiments. However, example embodiments are not limited to the preferred embodiments. Those skilled in the art will appreciate that various modifications and variations are possible, without departing from the scope and spirit of the appended claims.

What is claimed is:

1. A method for preparing a nanocrystal-polydimethylsiloxane composite comprising:
    dispersing nanocrystals and polydimethylsiloxane derivatives having two or more amine functional groups in a solvent to prepare a solution of a nanocrystal-polydimethylsiloxane composite wherein the nanocrystals are bound to the polydimethylsiloxane derivatives; and
    reacting the nanocrystal-polydimethylsiloxane composite solution with isocyanate, followed by drying, to obtain a nanocrystal-polydimethylsiloxane composite having urea cross-links formed between the polydimethylsiloxane derivatives.

2. The method according to claim 1, wherein the urea crosslink-containing polydimethylsiloxane derivative is at least one of compounds represented by Formula I below:

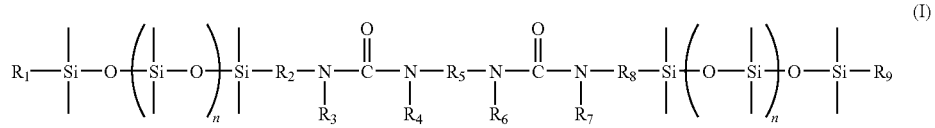

(I)

wherein $R_1$ and $R_9$ are each independently an amine-containing $C_{1-20}$ aliphatic or aromatic group; $R_2$, $R_5$ and $R_8$ are each independently a $C_{1-20}$ aliphatic or aromatic group; $R_3$, $R_4$, $R_6$ and $R_7$ are each independently hydrogen, or a $C_{1-20}$ aliphatic or aromatic group; and n and m are each independently an integer of 2 to 10.

3. The method according to claim 1, wherein the amine-containing polydimethylsiloxane derivative is at least one of compounds represented by Formula II below:

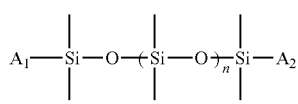

(II)

wherein n is an integer of 2 to 10, and $A_1$ and $A_2$ are each independently an amine-containing $C_{1-20}$ aliphatic or aromatic group.

4. The method according to claim 1, wherein the polydimethylsiloxane derivatives are continuously bound to the nanocrystal surface to form a layer.

5. The method according to claim 1, wherein the method is carried out at ambient temperature.

6. The method according to claim 1, wherein the nanocrystal is composed of a material selected from the group consisting of metals, Group II-VI compounds, Group II-V compounds, Group II-VI compounds, Group III-V compounds, Group IV-VI compounds, Group I-III-VI compounds, Group II-IV-VI compounds, Group II-VI-V compounds, and alloys or combinations thereof.

7. The method according to claim 1, wherein the nanocrystal has a core-shell structure.

8. The method according to claim 7, wherein the nanocrystal core is selected from the group consisting of CdS, CdSe, CdTe, ZnS, ZnSe, ZnTe, HgS, HgSe, HgTe, GaN, GaP, GaAs, InP, InAs, InSb, AlN, AlP, AlAs, AlSb, SiC, Fe, Pt, Ni, Co, Al, Ag, Au, Cu, FePt, Si, Ge, PbS, PbSe, PbTe, and alloys or combinations thereof, and the nanocrystal shell is selected from the group consisting of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, and alloys or combinations thereof.

9. An electronic device comprising a nanocrystal-polydimethylsiloxane composite in which one or more polydimethylsiloxane derivatives having a urea cross-link are bound to the surface of a nanocrystal.

10. The electronic device according to claim 9, wherein the nanocrystal has a core-shell structure.

11. The electronic device according to claim 9, wherein the electronic device is selected from the group consisting of displays, lasers, linear photodiodes, sensors and photovoltaic devices.

12. A nanocrystal composition for preparing a nanocrystal-polydimethylsiloxane composite, the composition comprising:
    a nanocrystal:
    an amine-containing polydimethylsiloxane derivative;
    an isocyanate; and
    a solvent.

13. The nanocrystal composition as claimed in claim 12, wherein the amine-containing polydimethylsiloxane derivative is represented by Formula II below:

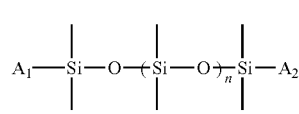

(II)

wherein n is an integer of 2 to 10, and $A_1$ and $A_2$ are each independently an amine-containing $C_{1-20}$ aliphatic or aromatic group.

14. The nanocrystal composition as claimed in claim 13, wherein the amine-containing polydimethylsiloxane derivative is a bis(3-aminopropyl) terminated polydimethylsiloxane.

15. The nanocrystal composition as claimed in claim 12, wherein the surface of the nanocrystal is coordinated with organic materials.

16. The nanocrystal composition as claimed in claim 15, wherein the organic materials are selected from the group consisting of $C_6$-$C_{22}$ alkanes and alkenes having a terminal carboxyl (COOH) group; $C_6$-$C_{22}$ alkanes and alkenes having a terminal phosphonic acid ($PO_3H_2$) group; $C_6$-$C_{22}$ alkanes and alkenes having a terminal phosphine oxide (PO) group; $C_6$-$C_{22}$ alkanes and alkenes having a terminal sulfhydryl (SOOH) group; and $C_6$-$C_{22}$ alkanes and alkenes having a terminal amino ($NH_2$) group.

17. The nanocrystal composition as claimed in claim 12, wherein the solvent is selected from the group consisting of alkyl alcohols, acetone, ethyl acetate, dichloromethane, chloroform, dimethylformamide, tetrahydrofuran, dimethylsulfoxide, pyridine, alkyl amines and mixtures thereof.

18. The nanocrystal composition as claimed in claim 12, further comprising a capping agent having $Si(OR)_3$ terminal groups.

19. The nanocrystal composition as claimed in claim 12, wherein the nanocrystal is composed of a material selected from the group consisting of metals, Group II-VI compounds, Group II-V compounds, Group II-VI compounds, Group III-V compounds, Group IV-VI compounds, Group I-III-VI compounds, Group II-IV-VI compounds, Group II-VI-V compounds, and alloys or combinations thereof.

20. The nanocrystal composition as claimed in claim 12, wherein the nanocrystal has a core-shell structure.

* * * * *